Sept. 6, 1938.  W. G. FOTSCH  2,129,086

NUT RETAINER FOR SPLIT SHANK CONNECTERS

Filed Sept. 5, 1935

Inventor
William G. Fotsch
By:

Patented Sept. 6, 1938

2,129,086

UNITED STATES PATENT OFFICE 2,129,086

NUT RETAINER FOR SPLIT SHANK CONNECTERS

William G. Fotsch, Chicago, Ill., assignor to Reliable Electric Co., Chicago, Ill., a corporation of Illinois Application September 5, 1935, Serial No. 39,276

2 Claims. (Cl. 173—263)

This invention relates to wire connecters and more particularly to wire connecters of the split shank or bolt type wherein the threaded portion of a bolt is slotted to provide a pair of spaced parallel legs and a nut is adapted to be threaded on said legs. The nut carries a contact member which is rotatable therein. The contact member is just wide enough to slide freely between the slot in the two legs of the bolt and has means engaging the opposite end faces of the nut to prevent its removal from the nut. The contact element engages conductors placed in the slot in the bolt and clamps them together when the nut is screwed down tightly thereon.

The present invention is directed toward a nut retainer for connecting the nut to the bolt in such a fashion that the same will not be separated therefrom.

In a device of this character, it is the purpose of the present invention to provide a retainer which can be added to the structure at a very low cost and which, when added, offers no difficulty in taping of the connecter.

Furthermore, the present invention contemplates a device of this character which not only prevents removal of the nut so that it may be lost but also acts to align the contact member carried by the nut with the slot in the bolt thus facilitating attachment of the connecter to conductors which are to be clamped together.

The features and advantages of the invention will be more readily apparent as the description proceeds, reference being had to the accompanying drawing wherein the preferred form of the invention is shown.

In the drawing—

Figure 1:
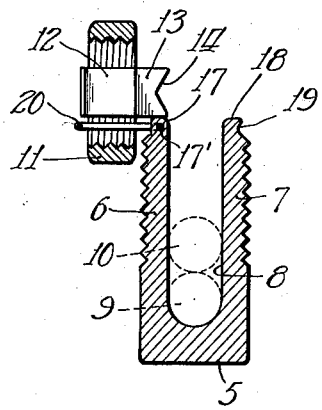
Fig. 1 is a sectional view taken longitudinally of the device with the nut removed from the bolt.

Referring now in detail to the drawing, the numeral 5 indicates a split bolt having a pair of threaded legs 6 and 7 separated by the slot 8. A pair of conductors 9 and 10 are indicated in position in dotted lines in Fig. 1 and Fig. 2. A nut 11 is screw threaded for mounting upon the legs 6 and 7 and carries a contact member 12 which is in the form of a solid lug having at one end a conductor engaging portion 13 extending over the adjacent face of the nut 11 and grooved as indicated at 14 on the face which engages the conductors.

At its other end, the contact member 12 has ears 15 and 16 bent outwardly to engage the end face of the nut 11 to thus prevent removal of the contact member 12 from the nut 11. The width of the contact member 12 is such that it slides freely in the slot 8 although it substantially fills the slot.

The legs 6 and 7 have reduced extensions 17 and 18 at their upper ends and the reduced extension 17 has a hole 17' bored therethrough which hole runs substantially parallel to the plane of the slot 8. The extension 18 may desirably be undercut as indicated at 19 for a purpose which will presently appear.

A nut retaining member for connecting the nut 11 with the split bolt 5 is mounted on the leg 6 and comprises a metal loop 20 preferably of spring wire and having its opposite end portions extending in the hole 17' in the extension 17 to hinge the wire loop 20 to this extension. The wire loop is provided with a shank portion formed by parallel portions 21 and 22 of the loop which shank portion is adapted to extend through the nut 11, as illustrated in Fig. 1, when the nut is unscrewed from the bolt 5.

The width of this shank portion is slightly less than the greatest dimension of the space between the contact member 12 and the adjacent wall of the nut 11 so that this shank portion, while it can slide in the space, substantially prevents relative rotation of the contact member 12 with respect to the loop 20. This feature of the shank portion is of particular value in aligning the contact member 12 with the slot 8 when the nut is to be threaded upon the legs 6 and 7.

At its other end, the loop 20 is provided with a flattened portion 23 which flattened portion is of a greater width than the greatest dimension of the space between the member 12 and the nut, or, in other words, of greater width than the greatest cross sectional dimension of the leg 6. This flattened portion 23 prevents removal of the nut from the loop 20 except by threading it down on the legs 6 and 7 so that the connecter is made effectively a one piece structure in so far as the lineman who uses it is concerned.

Figure 3:
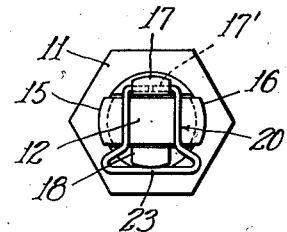
Fig. 3 is a plan view of the device shown in Fig. 2 with the nut retainer folded down.

The flattened portion 23 also serves an additional purpose as it is adapted to hook over the extension 18 on the leg 7 in the position shown in Fig. 3 so as to hold the wire loop 20 flat on the top end of the bolt 5. This aids the operator in taping the connecter as it leaves no projecting portions which would be difficult to cover with the tape.

Figure 2:
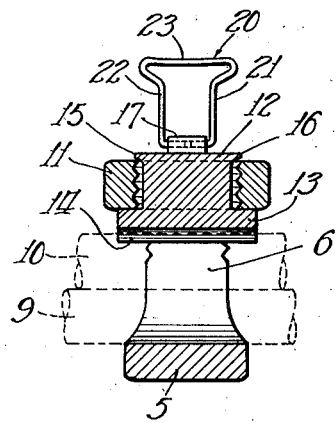
Fig. 2 is a sectional view taken at right angles to Fig. 1 showing the nut in clamping position.
Figure 4:
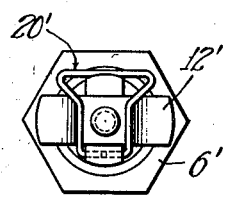
Fig. 4 is a plan view of a connecter using a slightly different form of contact member.
Figure 5:
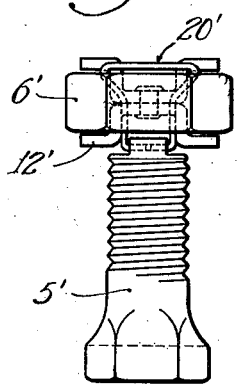
Fig. 5 is a side elevation of the connecter shown in Fig. 4.

In the form shown in Figs. 4 and 5, the bolt 5' and the nut 6' as well as the wire loop 20' are substantially the same as those shown in Figs. 1 to 3 but in this case a reversible contact member 12' of the form shown in the prior application Serial Number 679,598, which has matured into Patent No. 2,037,066, issued Apr. 14, 1936, by John B. Cook and myself is shown. The device shown in Figs. 4 and 5 functions in the same fashion as that shown in Figs. 1 to 3 and it is believed need not be further described.

From the above description, it is believed that the construction and advantages of this device will be readily apparent to those skilled in the art.

Having thus described one specific form of my invention what I claim as new and desire to secure by Letters Patent is:

1. In a wire connecter, the combination of a bolt having the threaded portion thereof slotted to provide spaced legs with a nut having a contact member rotatably mounted therein and slidable between said legs as the nut is turned on the bolt, and having a portion extending over one end face of the nut for engaging wires placed between said legs, said legs having reduced extensions at their free ends and a metal loop hinged to one of said extensions and having a shank portion leading from the hinge and a flattened end portion wider than the greatest cross sectional dimension of the leg to which it is hinged, said flattened end portion of the loop being adapted to snap over the reduced extension of the leg to which it is not hinged.

2. In a wire connecter, the combination of a bolt having the threaded portion thereof slotted to provide spaced legs with a nut having a contact member rotatably mounted therein and slidable between said legs as the nut is turned on the bolt, and having a portion extending over one end face of the nut for engaging wires placed between said legs, said legs having reduced extensions at their free ends, and a wire loop hinged to one of said extensions and having a shank portion leading from the hinge and a flattened end portion wider than the greatest cross sectional dimension of the leg to which it is hinged, said flattened end portion of the loop being adapted to snap over the reduced extension of the leg to which it is not hinged, and said shank portion of the loop being too wide to rotate between the nut and the contact element thereby keeping contact element in true alignment with said slot.

WILLIAM G. FOTSCH.